Patented Sept. 29, 1942

2,297,351

UNITED STATES PATENT OFFICE 2,297,351

CONJOINT POLYMERIZATION OF DICARBOXYLIC ACIDS AND OLEFINIC COMPOUNDS

Howard L. Gerhart, Milwaukee, Wis., assignor to Pittsburgh Plate Glass Company, Allegheny County, Pa., a corporation of Pennsylvania No Drawing. Application November 23, 1938,
Serial No. 242,127

4 Claims. (Cl. 204—158)

The present invention relates to artificial resins and it has particular relation to such resins as are obtained by reacting substituted or unsubstituted ethylene $\gamma\beta$ dicarboxylic acids or anhydrides thereof with a polymerizable olefin.

One object of the invention is to provide a clear, hard, tough, stable, resin of the above type which is relatively free from bubbles or cavities.

A second object of the invention is to provide a new method of bonding together sheets and bodies of transparent materials such as glass.

These and other objects will be apparent from consideration of the following specification and the appended claims.

It has heretofore been proposed to heat an unsaturated dicarboxylic acid, such as maleic acid or its anhydride and a polymerizable olefin such as styrene to obtain polymerization products of white powdery character, which are soluble in acetone and dilute alkalies.

The present invention is based upon the discovery that unsaturated dicarboxylic acids of the type of maleic acid, or maleic anhydride, or fumaric acid, or substituted maleic or fumaric acid and polymerizable olefins of the type of styrene will under the influence of actinic radiation react to form clear and hard resins which are relatively insoluble and substantially free of voids. These resins are well adapted for molding, cutting, pressing, or otherwise forming into bodies of great beauty. The resin-forming reaction may be carried out completely or at least in its final stages by casting the reacting mass in a suitable mold thus obtaining directly the finally desired object.

The invention involves as a further feature the discovery that in many instances the reaction of the dicarboxylic acid and the olefin, to form the resin, may be effected in the presence of a solvent, which solvent is imbibed by or permanently absorbed by the resin to form solvated bodies. The term acid as herein employed includes the anhydrides of the Cis acids, such as maleic acid which are susceptible of forming anhydrides.

The reaction to form the new resins is typified by that between maleic acid or maleic acid anhydride and styrene. The two compounds are simply admixed directly or are introduced into a solvent such as triacetin and are then caused to react by actinic irradiation at a temperature within the range of about 20 to 50° C. Irradiation of the reactants may be continued throughout the period of reaction, but it may be discontinued after the reaction has started. It is also possible to introduce a small amount (e. g. 1 to 10%) of preliminarily irradiated reactants into the main batch and thus to obviate further irradiation.

Reaction may also be initiated by application of heat and after it has progressed sufficiently far, heating is discontinued. If very hard products are desired the mass may be finally heat treated at a suitable temperature (e. g. 100-200° C.) until the desired stage is reached.

If reaction is effected in the absence of solvents and at relatively low temperatures, the maleic acid will be insoluble in the styrene and it will be desirable to agitate the mixture in order to keep the reactants in suspension. However, by heating the mixture to about 40° C. complete solution of the maleic acid is effected.

The reaction can be brought to completion within an hour or less but by reducing the degree or time of irradiation it is possible to extend it over a period of several days.

The reaction product obtained from maleic anhydride and styrene may be represented by the formula:

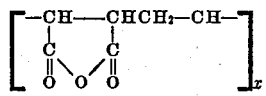

where $x$ represents the number of the foregoing groups in the molecule and is of variable value.

Since the reaction is general in character and applies to many unsaturated dicarboxylic acids or anhydrides; i. e. substituted maleic or fumaric acid and to many of the polymerizable olefins, the product may be represented by the type formula:

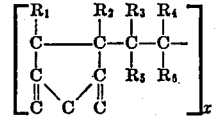

where the groups $R_1$ $R_2$ $R_3$ $R_4$ $R_5$ $R_6$ may be practically any of the possible substituent groups. Examples of a few of the possibilities include hydrogen and chlorine, carbonyl, carboxyl, alkyl, aromatic and the like groups. Examples of possible ethylene $\gamma\beta$ dicarboxylic acids or ethylenic dicarboxylic acids which are transformable to $\gamma\beta$ form, which may be employed include maleic acid (above described) fumaric acid, the mono or di chloro substituted maleic and fumaric acids, alkylated maleic and fumaric acids, such as itaconic, citraconic acid, mesaconic acid, mono and di phenyl maleic acid, benzyl maleic, dibenzyl maleic, ethyl maleic, or any similar acids containing a double bond in the chain between the two carboxyl groups.

The number of polymerizable olefinic compounds is also very large and of general character. It includes styrene above described, vinyl acetate, vinyl chloride, methyl styrene, parahydroxy styrene, acrylic acid, methyl, ethyl, or other esters of acrylic acid, acrolein, unsaturated ketones, such as methyl vinyl ketone, indene, coumarone and the like.

It is to be understood that any one or more of the dicarboxylic acids can be combined with any one or more of the olefinic compounds, to provide resins in great variety. The ratio of the dicarboxylic acid to the olefinic compound is susceptible of wide variation, but for purposes of illustration may be considered as approximately molar.

As previously stated, the reaction can be conducted in the absence of solvents. However, in many instances it is preferable to dissolve or admix the reactants with solvents such as triacetin, acetone, methyl ethyl ketone, ethyl aceto acetate, diacetone, acetic anhydride, mesityl oxide, ethyl oxide, or any other solvent for the reactants.

Oxidizing agents such as benzoyl peroxide may be employed to speed up reaction of the resin-forming materials. Reducing agents, such as hydroquinone, pyrogallol, tannic acid, etc. may be employed to retard reaction.

The solvents in many cases are imbibed in the resinous reaction product without dissolving the latter and when so incorporated can not readily be removed by evaporation. Therefore, they may be retained as permanent components of the resinous body. The bodies still retain their clarity, hardness and toughness and usually are bubble free. The solvated resins may be hardened by baking them for a short time.

As previously stated, the resinous bodies are insoluble, but it is possible to cast incipiently polymerized masses into molds in which hardening to final form is effected. It is also possible to conduct polymerization in molds formed of soft glass, pyrex, or other material transparent to actinic rays. Likewise it is possible to introduce reactive mixtures containing at least a portion of irradiated material into opaque molds of rubber or nitrocellulose and then to complete polymerization. It is also possible to heat the resins to the softening point and then to press them to shape.

A further application of the invention consists in providing a layer of polymerizable materials between two sheets of glass. By irradiating this glass, it is possible to form a film of transparent closely adherent resin between the glass sheets, thus forming a safety glass. The materials may be partially polymerized prior to application to glass. In a similar manner this class of resins may be employed in the lamination of wood, fabrics or other materials.

Resinous bodies can be cut to any desired form and then polished to provide a great variety of articles. The resins and scraps of the resin may be shredded or powdered and then molded under heat and pressure, or the comminuted material may be mixed with further polymerizable material which by appropriate treatment will be converted into hard bonding resins. Oil-soluble dyes such as Rhodamin B. Victoria Green, and pigments such as titanium dioxide may be incorporated into the resins prior to final solidification.

The new resins may be employed in the formation of optical lenses, jars, or lids for jars for cosmetics, drugs, foods and the like. They may be cast or cut to form an infinite variety of handles, buttons, and objects of similar nature. They may also be used for the formation of panels and coverings for electrical apparatus of a great variety.

Application of the principles of the invention is illustrated by the following examples:

EXAMPLE I

About 10.4 grams styrene and 9.8 grams maleic anhydride are placed in a tube of soft glass. Only a small portion of the anhydride will dissolve at 20—30° C. The tube is agitated to keep the solid particles of maleic anhydride in suspension while it is located 12 inches from a carbon arc at 25 to 30° C. Within one hour the contents will harden to a solid polymer which is not entirely clear.

If the same procedure is followed at 40° C. when the maleic anhydride is entirely soluble in the styrene, the resin will be clear, transparent, and homogeneous, insoluble in organic solvents and dilute alkali.

EXAMPLE II

*Solvated insoluble resin.*—A solution consisting of 41.6 gm. styrene, 39.2 gm. maleic anhydride and 20 gm. triacetin was irradiated without agitation at 25–30° C. at a distance of 12 inches from a carbon arc. In one hour the mixture hardened completely to a clear, colorless, transparent resin, insoluble in organic solvents and dilute alkalis. This resin hardened considerably in 24 hours at room temperature. Total weight of resin is 100 grams.

A resin having a higher softening point is obtained if the solution consists of 41.6 gm. styrene, 39.2 grams maleic anhydride and 10 gm. triacetin. In place of triacetin may be used acetone, methyl ethyl ketone, ethyl aceto-acetate, diacetone, acetic anhydride, mesityl oxide, ethyl acetate.

EXAMPLE III

Resins formed according to Example 2 sometimes contain bubbles or void spaces which detract from their appearance and value. These void spaces are not present when the reaction is caused to proceed at a decreased rate over a longer time.

A solution consisting of 104 grams styrene, 98 grams maleic anhydride and 50 grams acetone is irradiated for 5 minutes at a distance of two feet from a carbon arc at a temperature between 20 and 40° C. The mixture is cooled and allowed to react slowly at a temperature which does not exceed 30° C. After 20 hours, the resin is irradiated for 10 minutes, then removed from the container and heated for ½ hour at 80–90° C. Upon cooling, there is obtained a clear transparent mass. This resin is extremely tough and can be machined.

EXAMPLE IV

A sample of a solution from Example 2 was placed between two glass plates of soft glass and irradiated for one hour as described. The resin formed as a thin film between the plates which were not easily separated.

EXAMPLE V

A portion of the solution of Example 2 was irradiated for five minutes until it had congealed to incipient gellation (the mass could still be poured). This enabled more of the material to be placed between the plates. During the second 15 minutes of irradiation, pressure was applied to the plates. The finished plates adhered well and shattered with difficulty.

EXAMPLE VI

The procedure in Examples 1, 2, 3, 4, and 5 can be shortened if 0.5 to 1.0% of a peroxide such as benzyl peroxide or ascaridole is added to the reactants. It is usually necessary to cool the mixture to maintain the low temperatures.

EXAMPLE VII

The procedure of 1, 2, 3, 4, and 5 may be lengthened by adding 1 to 2% of an inhibitor such as hydroquinone or p-ter-butyl catechol.

EXAMPLE VIII

A solution of Example 2 was irradiated for 5 minutes then set away in diffused light at 25° C. In two days the polymer hardened to a strong, clear transparent resin. At 40° C. the time of reaction needed was three hours.

EXAMPLE IX

About 1 cc. of the solution of Example 2 was irradiated 5 minutes and added to 30 cc. of unirradiated solution. In two days at 25° C. the entire mass was converted into a clear hard resin.

EXAMPLE X

Resins of any color may be produced by adding to the reactants the desired quantity of a dye or other coloring matter. This coloring matter may at the same time act as an accelerator or inhibitor for the reaction.

EXAMPLE XI

It is not necessary to provide a strong source of irradiation if a longer reaction time is allowed. A solution consisting of 10 grams maleic anhydride, 10 grams styrene and 5 grams of mesityl oxide was prepared in diffused light at 25° C. and placed in a bottle coated with a black lacquer; after 30 days at room temperature, the contents congealed and after 70 days the resin was hard and extremely tough.

EXAMPLE XII

Equimolecular proportions of styrene and citraconic anhydride were placed at a distance of 18 inches from a carbon arc and irradiated for 10 hours. At 35-40° C., a transparent, slightly straw-colored resin resulted.

EXAMPLE XIII

About 6.5 grams monochlormaleic anhydride and 5.0 grams styrene were exposed to the carbon arc for two hours until the reactants gelled. After 20 hours a very tough and transparent resin was formed. The same type of resin is found when the time of irradiation is reduced to 8 hours.

EXAMPLE XIV

About 8.6 grams of vinyl acetate, 9.8 grams maleic anhydride, and 0.05 gram benzyl peroxide is irradiated five hours at 20 inches from the carbon arc. A resin, similar to the corresponding maleicstyrene resin is obtained.

The embodiments of the invention herein described are merely exemplary and numerous modifications may be made therein without departure from the spirit of the invention or the scope of the appended claims.

What I claim is:

1. In a method of preparing a clear solid synthetic resin body, which body is insoluble in alkali and common organic solvents for resins, the step comprising polymerizing a mixture of approximately equimolecular proportions of a material selected from the class consisting of maleic acid, maleic acid anhydride and fumaric acid, together with a polymerizable compound from a class consisting of vinylic and acrylic compounds by subjecting the mixture to irradiation with actinic light while the mixture is at a temperature within the range of about 20 to 40 degrees C. until said body is obtained.

2. In a process of preparing a resin which is insoluble in common organic solvents for resins and in alkali, the step which comprises subjecting a mixture of approximately equimolar ratios of styrene and maleic acid anhydride to the polymerizing action of actinic light while the mixture is at a temperature of 20 to 40 degrees C., to effect polymerization into a clear, solid insoluble resin.

3. In a process of preparing a resinous body, the step which comprises subjecting a mixture of approximately equimolar ratios of styrene and maleic acid anhydride dissolved in a non-reacting mutual solvent medium for the components of the mixture, to irradiation with actinic light while the mixture is at a temperature of about 20 to 40 degrees C. to obtain a clear solid resinous product, which is insoluble in said mutual solvent medium and in alkali, but which contains said medium imbibed therein.

4. As a new product the resin resulting from the conjoint polymerization of approximately equimolar ratios of maleic anhydride and styrene in a non-reacting mutual solvent medium for the components of the mixture by irradiation of the mixture at a temperature of about 20 to 40 degrees C., said resinous product containing the solvent medium imbibed therein, but being insoluble in the medium.

HOWARD L. GERHART.